Aug. 24, 1926.
J. A. OBERMAIER
METER
Filed Nov. 25, 1922    2 Sheets-Sheet 2
1,597,327
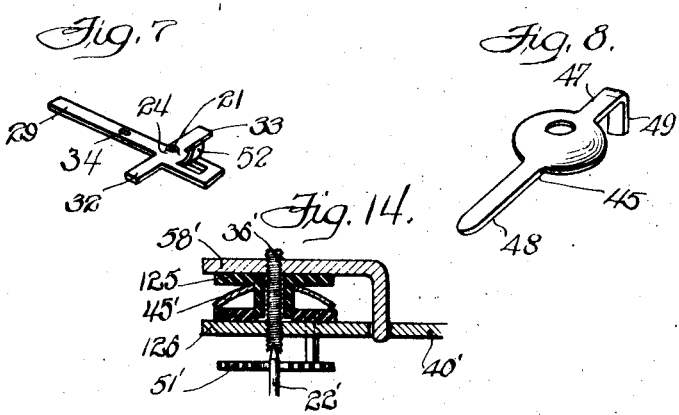
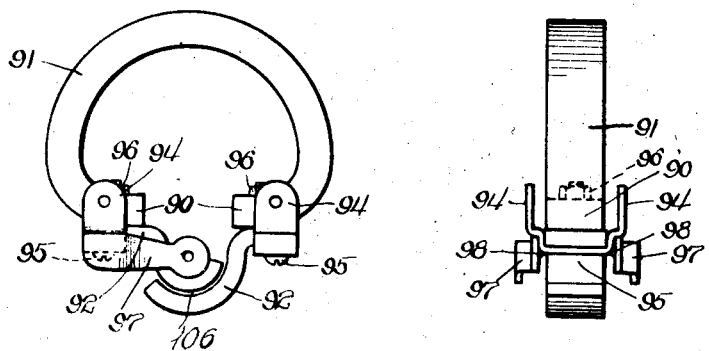
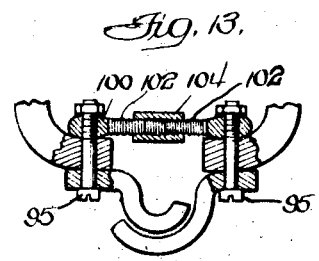
Inventor:
John A. Obermaier Patented Aug. 24, 1926.

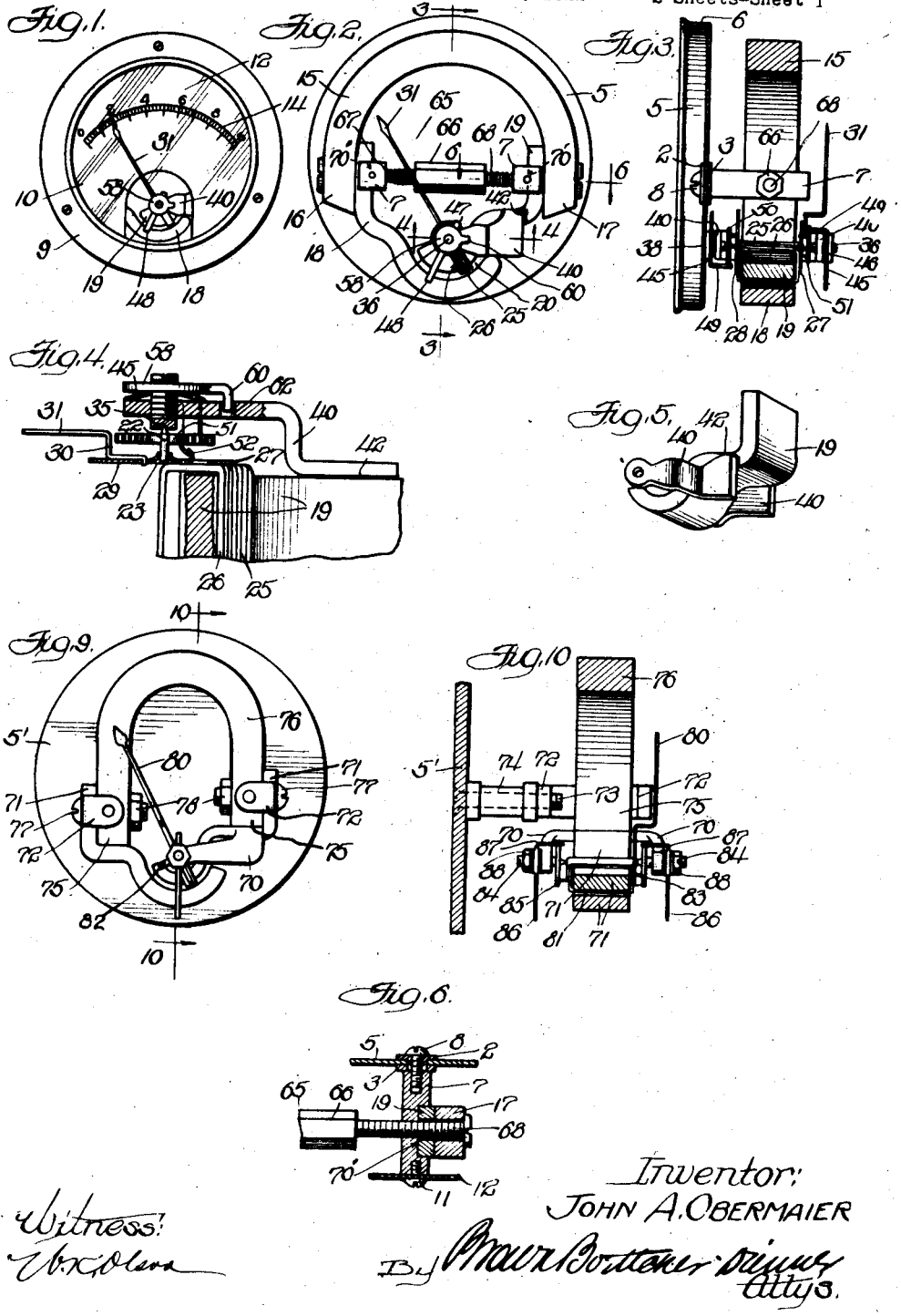

1,597,327

UNITED STATES PATENT OFFICE.

JOHN A. OBERMAIER, OF CHICAGO, ILLINOIS.

METER.

Application filed November 25, 1922. Serial No. 603,381.

My invention relates to improvements in electrical measuring instruments and more particularly to electrical measuring instruments of the movable-coil permanent magnet type.

Instruments of this general description comprise a current carrying coil mounted in the field of a permanent magnet, to be turned when a current flow is established through the coil, by the inter-action between the field established by the current flow and the field of the permanent magnet. The coil carries a pointer which is deflected over a scale by the turning moment or torque imposed.

A uniform scale in instruments of this class is highly desirable. A uniform air gap does not necessarily provide a uniform scale because of the irregular distribution of the magnetic flux along the poles of the magnet. The matter of securing a uniform magnetic field in the active space between the poles of the magnet and especially in securing a uniform relation between the poles of a number of magnets (for quantity production) has presented a difficult practical problem. Fixed equalizing members for counteracting irregularities in the field have not proved satisfactory because in different instruments of the same class there is always a variation in these irregularities.

Further requisites of a good commercial instrument are accuracy, permanency of calibration; reliability of working; low loss and magnetic leakage; independence of external magnetic and mechanical disturbance and a light moving system. Furthermore simplicity is desired because the more simple a device of this class is generally the more reliable it is and the less likelihood there is of it becoming deranged.

Broadly the object of my present invention is to improve the working and structure of an instrument of this class and to overcome or minimize to as great a degree as possible the difficulties heretofore encountered.

A more specific object is to improve the mechanical construction, assembly and relation between the parts of such an instrument and to arrange the mounting faces of the poles of the magnet to secure convenience and accuracy in grinding.

Another object is the provision of adjustable means for equalizing the magnetic flux and distributing the same uniformly through the path of movement of the current carrying coil of the instrument;

Another object is to minimize the loss and magnetic leakage and the external magnetic disturbances;

Another object is the provision of a light moving system and an improved mounting therefor and to simplify the problem of balance;

A further object is the provision of a sensitive small capacity instrument especially adapted for use in connection with thermo-couples and the like;

In order to acquaint those skilled in the art with a specific embodiment of my invention and the manner of making and using the same I shall now describe several specific embodiments of the same in connection with the accompanying drawings in which;

Figure 1 is a front elevational view of an instrument embodying my invention;

Figure 2 is a slightly enlarged similar view of the instrument with the cover or casing and dial removed;

Figure 3 is a vertical section taken on the line 3—3 of Figure 2;

Figure 4 is an enlarged horizontal section taken on the line 4—4 of Figure 2;

Figure 5 is a perspective view of the coil bracket carrying pole piece of the instrument shown in Figures 1 to 8;

Figure 6 is an enlarged horizontal section taken on the line 6—6 of Figure 2;

Figure 7 is a perspective view of the pointer carrying pivot base;

Figure 8 is a perspective view of one of the adjusting arms;

Figure 9 is a view similar to Figure 2 of a modification;

Figure 10 is a vertical section taken on the line 10—10 of Figure 9;

Figure 11 is a view similar to Figure 9 of a modification with the base of the instrument omitted and;

Figure 12 is a side view of the arrangement shown in Figure 11 looking from the left;

Figure 13 is a fragmentary front view of the instrument shown in Figures 11 and 12 showing an adjustable coupling between the poles of the magnet; and Figure 14 is a horizontal section through the forward coil pivot showing an alternative mounting of the adjusting arm.

With reference now to the embodiments of the invention selected for illustration the instrument shown in Figures 1 to 8 comprises a base 5 formed of sheet metal with an out-turned marginal flange 6. The base 5 preferably carries the terminals (not shown) by means of which the current is led to the moving coil of the instrument and as shown in Figure 6 is provided with openings through which magnet supporting pieces 7 probably of brass or other suitable non-magnetic material are mounted as by means of screws 8. Bushings 2 and washers 3 of insulation, insulate the magnet supporting members 7 and screws 8 from the base 5. The base 5 is circular in form and the rim provided by the flange 6 is adapted to receive a cover or casing 9 of any approved design. The outer face of the cover 9 is provided with an opening in which a glass plate or disc 10 is mounted. The dial of the instrument is exposed to view through the glass plate or disc 10. The inner and outer ends of the magnet supporting pieces are ground or machined parallel and the outer ends are drilled and threaded to receive screws 11 through which a dial 12 is mounted. The dial 12 is provided with a scale 14 the division or scale marks of which are uniformly separated as shown.

The magnetic system of the instrument comprises a U-shaped permanent magnet 15 having a semi-circular intermediate portion terminating at its opposite ends in parallel legs or polar ends 16 and 17 straddling the projecting supporting pieces 7. The inner opposed faces of the ends 16 and 17 of the magnet are ground to true surfaces and as parallel as practically possible and soft iron extensions or pole pieces 18 and 19 are secured to these opposed parallel faces. The ends of the pole pieces 18 and 19 secured to the polar ends of the magnet 15 are flat and these flat ends when secured to the magnet are positioned in parallel relation with respect to each other. The pole pieces 18 and 19 are set or curved in at the ends of the legs 16 and 17 of the magnet and their free ends are of semi-circular formation arranged one within the other about a common axis as shown, to provide a single air gap 20 in which exists a uniform semi-circular magnetic field through which the current carrying coil of the instrument moves.

The moving system of the instrument comprises a coil 25 wound about a coil frame 26 encircling the semi-circular end of the pole piece 19 through the field.

The greater dimension of the coil is preferably arranged normal to the plane of movement of the pointer of the instrument as shown so that in balancing the distance from the axis of rotation to the outside of the coil which must be considered will be relatively small. This simplifies the problem of balance which is so difficult a one in an instrument of this class and provides a light compact moving system. Furthermore, with this arrangement, the area of the magnetic field may be increased without increasing the radial distance from the axis of the coil to the outside.

Secured to each of the opposite ends of the coil frame 26 are pivot bases 27 and 28 respectively. The outer or upper pivot base 27 is provided with an arm 29 to which the inner offset end 30 of a pointer or index arm 31 is suitably secured and a pair of oppositely extending balance arms 32 and 33. The arm 29 preferably extends beyond the offset mounting portion of arm 31 to receive a drop of solder or other suitable balancing weight. The arms 32 and 33 are similarly weighted with drops of solder or other suitable balancing weights. The inner end of the offset portion 30 of the pointer 31 is bent down and secured in an opening 34 in the pivot base 27.

While the mounting of the pointer just described is preferable the pivot end of the arm 31 may extend in and be mounted directly upon the coil frame 26 and be provided with projecting balance arms formed integral therewith if so desired.

In the embodiment shown in Figures 1 to 8 an opening 21 is punched through each of the pivot bases 27 and 28 to receive pins 22 which pins constitute the pivot or arbor of the instrument and provide an outstanding annular flange 23 about the mounted ends of the same. The inserted ends of the pins 22 are secured in place by soldering as shown at 23 or in any other suitable manner. The free ends of the pins 22 are pointed and are seated for oscillation at the common axis of the semi-circular ends of the pole pieces 18 and 19 in bearing seats or cups 35 in the inner opposed ends of coaxial adjustable bearing screws 36 and 38. The screws 36 and 38 are mounted in bracket arms 40. These bracket arms 40 which are in this particular instance made of brass or other suitable non-magnetic material so as to not interfere with the magnetic system of the instrument are offset down into the planes of the opposite edges of the soft iron pole piece 19 and soldered or otherwise suitably secured thereto as shown at 42.

Adjusting arms 45 mounted upon the screws 36 and 38 comprise cup-shaped hub portions 46 having oppositely projecting arms 47 and 48. The inner arm 47 of each adjuster is bent-in as shown at 49 in Figure 3 to form spring mounts and the outer ends of coiled springs 50 and 51 one of which is arranged at each end of the coil pivot or arbor to provide the controlling force against which the coil is turned, are attached to these bent-in ends 49. The inner ends of the springs 50 and 51, which springs are preferably coiled in opposite directions in the usual manner so that when the pointer of the instrument is deflected one of the springs is coiled up while the other is uncoiled, are attached to lugs or mounts 52 stuck up from each of the pivot bases 27 and 28 as, for example, in the manner shown in Figure 7.

The cup-shaped annular hub portion 46 of the adjusting arms 45 which are of spring material are provided with openings through which the bearing screws 36 and 38 extend freely and are clamped and tensioned between the arms 40 and clamping pieces 58. These clamping pieces 58 are provided with struck-in lugs 60 which engage in openings 62 in the arms 40 to hold the pieces 58 against accidental angular movement relative to the arms 40. The screws 36 and 38 each have threaded engagement with the clamping pieces 58, as well as with the arms 40 so that when the bearing screws are manipulated to adjust the bearings at the opposite ends of the coil pivot the space between the pieces 58 and arms 40 will remain the same and the adjustment of the tension of the spring mounting portions of the adjusting arms 45 will not be changed. When so desired, however, the adjustment of the tension of the cup mounting portions of the arms 45 may be changed or adjusted by disengaging the particular bearing screw from the arm 40 or removing it entirely, adjusting or clamping the cupped mounting portion to the desired adjustment and then threading the screw into place to hold the adjustment so clamped. In the embodiment shown in Figure 14 a bushing 125 and washer 126 of insulation, insulate the adjusting arm 45' from the screw 36', arm 40' and clamping piece 58'.

While it is already pointed out the inner opposed faces of the legs or polar ends 16 and 17 of the magnet are ground to true surfaces and as parallel as practically possible, I find that in practice it is impossible to obtain a quantity of such magnets in which the relation between these faces is uniform. A longitudinal or lengthwise convergence or divergence of the polar ends of the magnet is the most frequent variation. A slight variation in this direction will cause a relatively great inaccuracy or discrepancy in the reading or calibration of the instrument. There are also errors of use. Absolute permanency of calibration has been practically impossible. It is also well known that a uniform scale is required in an instrument of this class. A uniform air gap does not necessarily provide a uniform scale because the magnetic density or intensity is not uniform but varies along the poles of the magnet.

A uniform scale may however be obtained by maintaining a uniform flux or a magnetic field of uniform distribution and strength and to this end I provide an adjustable coupling 65 between the legs or polar ends 16 and 17 of the magnet. In the embodiment shown this is a differential coupling comprising a nut 66 preferably of brass or other non-magnetic material and a pair of screws 67 and 68, the threads of which are cut in the same direction but of different pitch. The screw 67 extends loosely through the polar end 16 and the flat mounted end of the pole piece 18 and has threaded engagement with the adjacent magnet supporting piece 7 and with the adjacent end of the nut 66. The screw 68 extends loosely through the polar end 17 and through the flat mounted end of the pole piece 19 and has threaded engagement with the adjacent magnet supporting piece 7 and with the adjacent end of the nut 66. The loose mounting of the pole pieces 18 and 19 permits a slight adjustment of the pole pieces at right angles or normal to the axis of the screws 67 and 68.

The coupling 65 provides an adjustment for conveniently and accurately adjusting the spread of the polar ends 16 and 17, which as already pointed out will vary, and thereby the arcuate gap between the pole pieces 18 and 19 to secure a uniform flux or magnetic field of uniform distribution therebetween. A uniform movement of the pointer for a given current throughout its arc of movement is thus provided in spite of such initial variations as might have been present between the mounting surfaces of the polar ends and in spite of the well known irregularity in the field due to the irregular magnetic distribution along the poles of the magnet. The engagement of the flat mounted portion of the pole pieces 18 and 19 in grooves 70' across the outer faces of the mounting pieces 7 holds the pole pieces firmly against lateral disarrangement. I find that an adjustment of this character is superior to a fixed provision counteracting irregularities in the field because such irregularities will vary in instruments that otherwise appear to be similar. The closer proximity of the free end of one pole piece to the adjacent polar end of the magnet, for example, the relation of the free end of the pole piece 18 to the polar end 16 of the magnet with respect to the relation of the free end of pole piece 19 to the polar end 17 has heretofore resulted in a stronger field at one end than at the other. To overcome this the practice has been to trim the end of the pole piece so that saturation limits the field strength at that point i. e., at or near zero. The adjustment which I have provided permits shifting part of the flux from the strong field at zero to the latter part of the scale.

After the instrument is given a careful initial adjustment and then used it frequently happens that it gets out of adjustment and in such case the differential coupling may be conveniently and quickly adjusted to again obtain the desired adjustment and proper operation of the instrument. The screws 67 and 68, the threads of which instead of being cut in the same direction and of different pitch may be provided with threads cut in opposite directions, are preferably of soft iron to provide an adjustable path of reluctance separating the magnetic circuit in which the motor element of the instrument is arranged from the remainder.

The adjustment described is especially satisfactory with the single gap meter disclosed because in providing a uniform flux through a single gap the problem of throwing one field out of adjustment in adjusting the other is avoided. The moving system is carried by one pole piece and therefore the relation to that pole piece is always substantially the same. The provision of non-magnetic coil-brackets and the arrangement of said brackets and relation between the pole pieces and polar ends of the magnet minimizes the disturbing influences. The mounting of one end of the coil brackets on the pole pieces and the journaling of the coil arbor in the free or unmounted ends thereof simplifies the instrument, decreases the cost and minimizes the disturbing influences.

As already pointed out the base 5 preferably carries the terminals through which connection is made with the external circuit. The circuit through the coil is preferably made through the springs 50—51 by connecting a conductor from one terminal to one of the adjusting arms 45 and a conductor between the other terminal and the other adjusting arm. Of course this connection between the coil and the external circuit may be varied.

In the modification shown in Figures 9, 10 and 11 the coil-brackets 70—70 are formed integral with one of the pole pieces 71—71 and each pole piece is provided with a pair of integral lugs 72—72. The inner or rear lugs are drilled and threaded to receive screws 73 through which the pole pieces are mounted upon the base 5' of the instrument. Sleeves or tubular posts 74 between these inner or rear lugs and the base 5' properly space the same therefrom. The posts 74 are preferably of brass or other suitable non-magnetic material and as before these posts and the screws 73 may be insulated from the base 5' as shown. The outer or forward lugs 72—72 are drilled and threaded and the dial (not shown) is mounted thereon by suitable screws.

The legs 75—75 of the magnet 76 are secured to the pole pieces with their outer faces in engagement with the opposed inner faces of the flat mounting ends of the pole pieces by screws 77 and cooperating nuts 78. As before an adjustable coupling may be provided between the legs of the magnet.

In this case the inner or pivoted end of pointer 80 extends in and is soldered or otherwise secured to one end of the coil frame 81 and is provided with projecting balance arms 82 formed integral therewith. A mounting piece provided with outstanding lugs for receiving and positioning and in which the inner end of the pointer is mounted is provided with a spring mount 83. A similar mounting piece on the opposite end of the coil frame is provided with a spring mount 85. These mounting pieces also provide bearings in which the inner pointed ends of adjustable bearing screws 84 engage. The adjusting arms 86 with their inturned spring mounts 87 are clamped on the bearing screws 84 between the opposite coil bracket arms 70—70 and nuts 88.

In the modification shown in Figures 12 and 13 the opposite polar ends 90—90 of the magnet 91 are turned inwardly toward one another and the mounting faces for the pole pieces 92—92 are thereby positioned in the same plane. This arrangement presents the mounting faces of the polar ends for convenient and accurate grinding and makes possible the obtaining of a higher degree of parallelism between these faces than possible heretofore. In this case separate brackets 94—94 preferably of brass or other suitable non-magnetic material are secured to the under surfaces of the flat portion of the pole pieces 92 by means of the screws 95 and nuts 96 which are employed for securing the flat mounting portions of the pole pieces to the flat parallel under faces of the inturned polar ends 90 of the magnet. The coil brackets 97 also preferably of brass are made up separately and soldered or otherwise suitably secured to one of the bracket members 94 as shown at 98.

An adjustable coupling comprising eye screws 100—100 mounted upon the inner ends of the screws 95 and provided with differentially threaded shanks 102 having threaded engagement in the opposite ends of a nut 104 provide an adjustment for equalizing the magnetic flux and distributing the same uniformly through the single gap 106 through which the current carrying coil of the instrument moves.

The low cost and simplicity of construction, the adjustment for equalizing the magnetic flux and distributing the same uniformly through the path of movement of the current carrying coil of the instrument, the minimization of disturbing influences, the provision for holding the pole pieces against lateral disarrangement, the mounting and light weight of the moving system, the obtaining of an open, legible and uniform scale and the arrangement of the mounting faces of the magnet for convenient and accurate grinding are highly important aspects of my invention.

I claim:

1. In a measuring instrument, a magnet having pole pieces forming a magnetic field, a coil movable through said field and means for adjusting the relative positions of said pole pieces to distribute the magnetic flux uniformly through the path of movement of said coil.

2. In a measuring instrument, a magnet having pole pieces forming a magnetic field, a coil movable through said field and means between said pole pieces for adjusting the relative positions thereof to equalize the magnetic flux and distribute the same uniformly through the path of movement of said coil.

3. In a measuring instrument, magnetic pole pieces providing a magnetic field, a coil movable through said field and means for adjusting the relative positions of said pole pieces in directions at right angles to each other for distributing the magnetic flux uniformly through the path of movement of the coil.

4. In a measuring instrument, a magnet, pole pieces connected to said magnet and providing a magnetic field, a coil movable through said field, said pole pieces being adjustable in one direction and in a second direction at substantially right angles to said first direction to distribute the magnetic flux uniformly through the path of movement of the coil.

5. In a measuring instrument, magnetic pole pieces providing a magnetic field, a coil movable through said field and a differential coupling for adjusting the relative positions of said pole pieces to distribute the magnetic flux uniformly through the path of movement of the coil.

6. In a measuring instrument, magnetic pole pieces providing a magnetic field, a coil movable through said field, a coupling for adjusting the relative positions of said pole pieces to distribute the magnetic flux uniformly through the path of movement of the coil, said coupling comprising a non-magnetic nut and screws co-operating with said pole pieces and having threaded engagement with said nut.

7. In a measuring instrument, magnetic pole pieces providing a magnetic field, a coil movable through said field, a non-magnetic nut, and screws extending through said pole pieces and having threaded engagement with said nut for adjusting the relative positions of said pole pieces to distribute the magnetic flux uniformly through the path of movement of the coil.

8. In a device of the class described, a supporting base, a pair of supporting members mounted thereon, a U-shaped magnet having substantially parallel legs straddling said mounting members, pole pieces having legs mounted between the legs of said magnet and said mounting members, an adjusting nut, and differential screws passing through the legs of the magnet and adjacent pole pieces and having threaded engagement with said nut.

9. In a device of the class described, a supporting base, a pair of supporting members mounted thereon, a U-shaped magnet having substantially parallel legs straddling said mounting members, pole pieces having legs mounted between the legs of said magnet and said mounting members, an adjusting nut, and differential screws passing through the legs of the magnet and adjacent pole pieces and having threaded engagement with said nut, said supporting members being grooved and said pole pieces lying in the grooves and held against lateral disarrangement thereby.

10. In a device of the class described, a bracket, a clamping element, a bearing screw having threaded engagement with said bracket and clamping element, an adjusting arm having an integral spring portion mounted on said screw between said bracket and clamping element, and an integral lug turned in from said clamping element and engaging in said bracket outwardly beyond the spring portion of said adjusting arm.

11. In a device of the class described, a bracket, a clamping element having a lug turned in and engaging in said bracket, a bearing screw having threaded engagement with said bracket and clamping element, and an adjusting arm having an integral spring portion mounted on said screw between said bracket and said clamping element.

In witness whereof, I hereunto subscribe my name this 22 day of November, 1922.

JOHN A. OBERMAIER.